United States Patent [19]

Kahn

[11] Patent Number: 5,826,254
[45] Date of Patent: *Oct. 20, 1998

[54] SYSTEM FOR SELECTIVELY BROWSING A LARGE, DISTRIBUTED DIRECTORY TREE USING AUTHENTICATION LINKS

[75] Inventor: Clifford Earl Kahn, Lexington, Mass.

[73] Assignee: Digital Equipment Corporation, Maynard, Mass.

[*] Notice: This patent issued on a continued prosecution application filed under 37 CFR 1.53(d), and is subject to the twenty year patent term provisions of 35 U.S.C. 154(a)(2).

[21] Appl. No.: 423,429

[22] Filed: Apr. 18, 1995

[51] Int. Cl.⁶ ..................................................... G06F 17/30
[52] U.S. Cl. .................. 707/5; 395/200.55; 395/200.33; 395/826; 395/557
[58] Field of Search ..................................... 395/600, 700, 395/200.55, 200.57, 200.33, 826, 557; 364/200; 707/5

[56] References Cited

U.S. PATENT DOCUMENTS

| | | | |
|---|---|---|---|
| 5,012,405 | 4/1991 | Nishikado et al. | 364/200 |
| 5,047,918 | 9/1991 | Schwartz et al. | 364/200 |
| 5,220,661 | 6/1993 | Hu et al. | 395/557 |
| 5,313,646 | 5/1994 | Hendricks et al. | 395/600 |
| 5,339,449 | 8/1994 | Karger et al. | 395/826 |
| 5,481,720 | 1/1996 | Loucks et al. | 395/700 |
| 5,497,463 | 3/1996 | Stein et al. | 395/200.33 |
| 5,544,360 | 8/1996 | Lewak et al. | 395/600 |
| 5,619,657 | 4/1997 | Sudama | 395/200.55 |
| 5,657,452 | 8/1997 | Kralowetz et al. | 395/200.57 |

*Primary Examiner*—Thomas G. Black
*Assistant Examiner*—Charles L. Rones
*Attorney, Agent, or Firm*—Christine M. Kuta; Gary E. Ross

[57] ABSTRACT

A browser for efficiently browsing large directory trees is presented. The browser uses authentication links as the structure through which the browser navigates. By adhering to the rules for a valid authentication chain, the browser increases efficiency by storing the results of preliminary steps to browsing.

11 Claims, 10 Drawing Sheets

SYSTEM FOR SELECTIVELY BROWSING A LARGE, DISTRIBUTED DIRECTORY TREE USING AUTHENTICATION LINKS

FIELD OF THE INVENTION

The present invention relates generally to computer systems and, more particularly, to browsing a large directory tree on a computer system.

BACKGROUND OF THE INVENTION

A graphical browser is a tool which allows a user to navigate through a hierarchy, or tree, of directories, files and other objects on a computer system. The graphical browser provides the user with a visual representation of the directory and file hierarchy and provides ways for the user to move through the hierarchy in order to find and access objects.

A typical graphical browser first displays the root directory with all the names of objects within the root directory in alphabetical order. The objects may be files or subdirectories. Some browsers mark objects as files or directories and some browsers display directories first in alphabetical order followed by files in alphabetical order. Browsers provide ways to expand the view of the hierarchy by providing ways to select a directory or directories and ways to display the objects beneath them. Generally, the user may continue to expand the display until the bottom of the hierarchy is reached. Browsers also provide equivalent means for the user to collapse the display of the hierarchy by removing files and directories from the display.

Typically, a graphical browser is used when a user does not know the precise name or location of a file within the hierarchy. In a small tree, it is not difficult to explore the hierarchy and locate a desired file. However, in a large tree, it is extremely difficult to find a particular file without some efficient means of selectively navigating the hierarchy, referred to as selective browsing. In selective browsing, selection criteria are used to limit what is displayed. An example of selection criteria used in the current art is limiting the files displayed to those which have a certain suffix through the use of a wild card character. This means of selective browsing reduces the overall number of files displayed but it does not guide the user within the directory and file tree. The wild card character is also not very useful where there are a large number of files with only one selection characteristic in common, and it is not at all useful where the user is unsure of the file name.

It remains desirable to have a means for efficiently browsing a large directory tree.

SUMMARY OF THE INVENTION

The problems of efficiently browsing a large directory tree are solved by the present invention of using authentication links as the structure through which the browser navigates. By adhering to the rules for a valid authentication chain, the browser increases efficiency by storing the results of preliminary steps to browsing. Also, by adhering to the rules, the browser is able to limit the parts of the directory tree displayed to those parts which are useful in attaining the object of the search through the directory tree.

A user of the browser receives information and manipulates the browser through a display system and navigates through the directory tree using a set of known principals of the tree called the authenticable roots set. The principals in the authenticable roots set are principals whose authentication up-links and crosslinks are established at the initialization of the browser system. This partial establishment of links allows the user to quickly expand and collapse the tree during browsing because only the down-links need to be found during operation by the user.

BRIEF DESCRIPTION OF THE DRAWINGS

The present invention together with the above and other advantages may best be understood from the following detailed description of the embodiments of the invention illustrated in the drawings, wherein.

DETAILED DESCRIPTION

Figure 1:
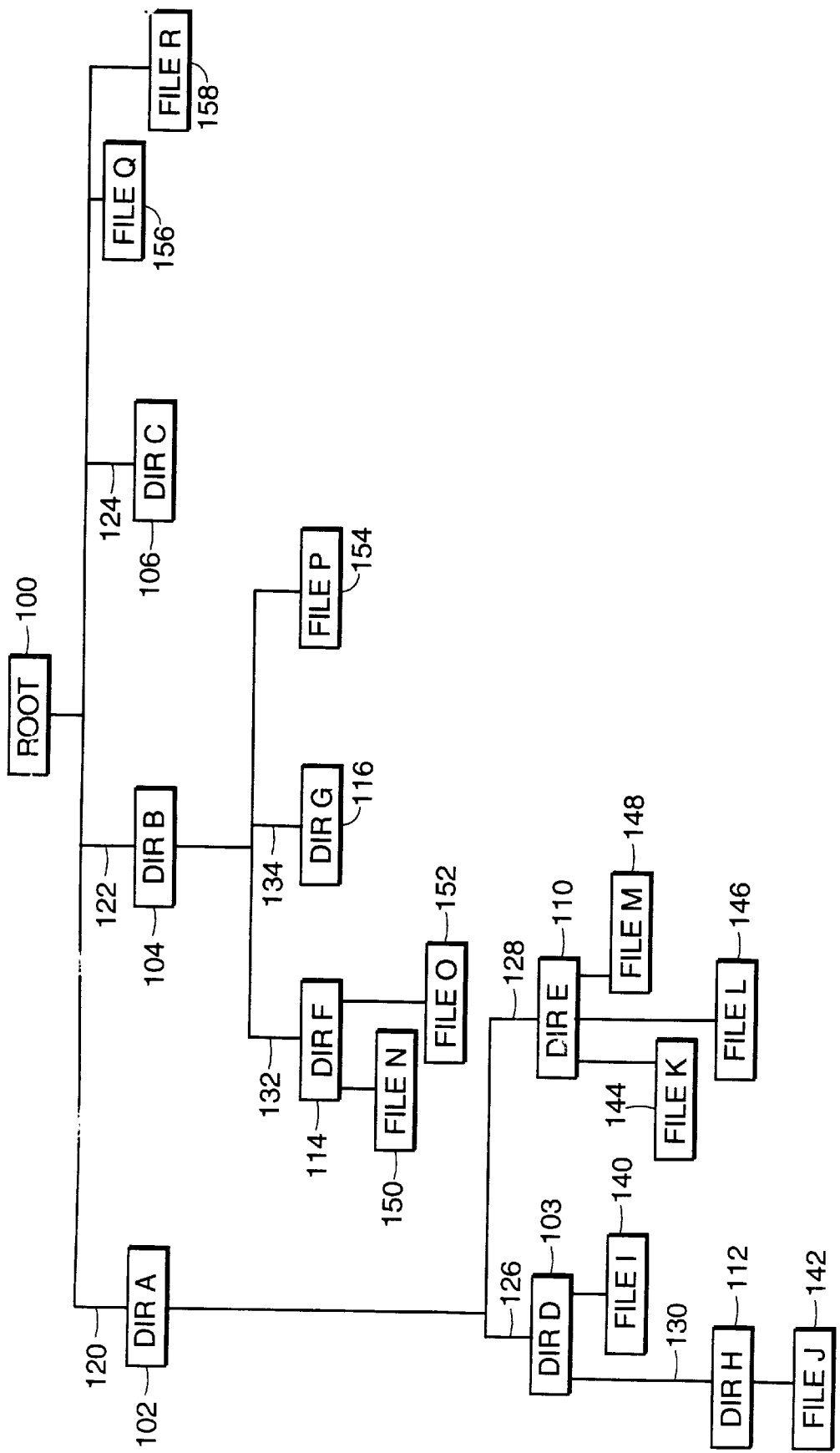
FIG. 1 is a directory tree.

Generally, information is organized in computer systems in directory trees. A tree is a set of one or more nodes in a hierarchical arrangement where a node can be a parent to another node with the exception of the root which has no parent. Every other node has exactly one parent. FIG. 1 shows an exemplary directory tree containing a root node, i.e. the root directory 100 which is the parent of other nodes, the subdirectories DIR A 102, DIR B 104 and DIR C 106. The subdirectory DIR A 102 is parent to sub-subdirectories DIR D 108 and DIR E 110 and DIR D 108 is parent to DIR H 112. The subdirectory DIR B 104 is parent to sub-subdirectories DIR F 114 and DIR G 116 below. The node DIR C 106 is empty. The hierarchy continues along many branches 120, 122, 124, 126, 128, 130, 132, 134 and ends in data entities, i.e. files 140, 142, 144, 146, 148, 150, 152, 154, 156, 158, or simply stops with an empty directory, such as the directory DIR C 106 or the directory DIR G 116. The objects at the ends of the branches on a tree are called the leaves of the tree.

Nodes in a tree may have ancestor and descendent relationships with other nodes. Ancestor relationships follow these rules:

| If x is y's parent, then x is an ancestor of y. | (1) |
|---|---|
| If x is an ancestor of y's parent, | (2) | then x is an ancestor of y where x and y are nodes in a tree and y is not the root. Descendent relationships follow the inverse rules to those above. Every node is a descendant of the root except the root itself. In FIG. 1, for example, DIR D 108 is the parent of DIR H 112 so DIR D 108 is therefore also an ancestor of DIR H 112. DIR A 102 is the parent of DIR D 108 and is therefore an ancestor of DIR D 108 and DIR H 112.

The computer system in which a tree resides could be a single stand-alone computer such as a workstation or a personal computer, but the tree could also reside in a large computer network having many devices and could even reside in several networks connected together. Different parts of the directory tree can be stored on different computers or some parts of the tree may be replicated on more than one computer. A directory service is included in the computer system to manage the tree and allow the various parts to be found when needed.

The type of computer system involving two or more computers cooperating and communicating over a network is called a distributed computing system. In a distributed computing system, a directory tree can be extremely large and spread over the entire system where nodes of the tree include devices connected to the network or networks in the system. The devices on the distributed computing system may be personal computers, workstations, minicomputers, mainframes, supercomputers or a combination of any of these. Disk farms and other storage devices may also be part of the network. A distributed computing system may also involve more than one network.

Figure 2:
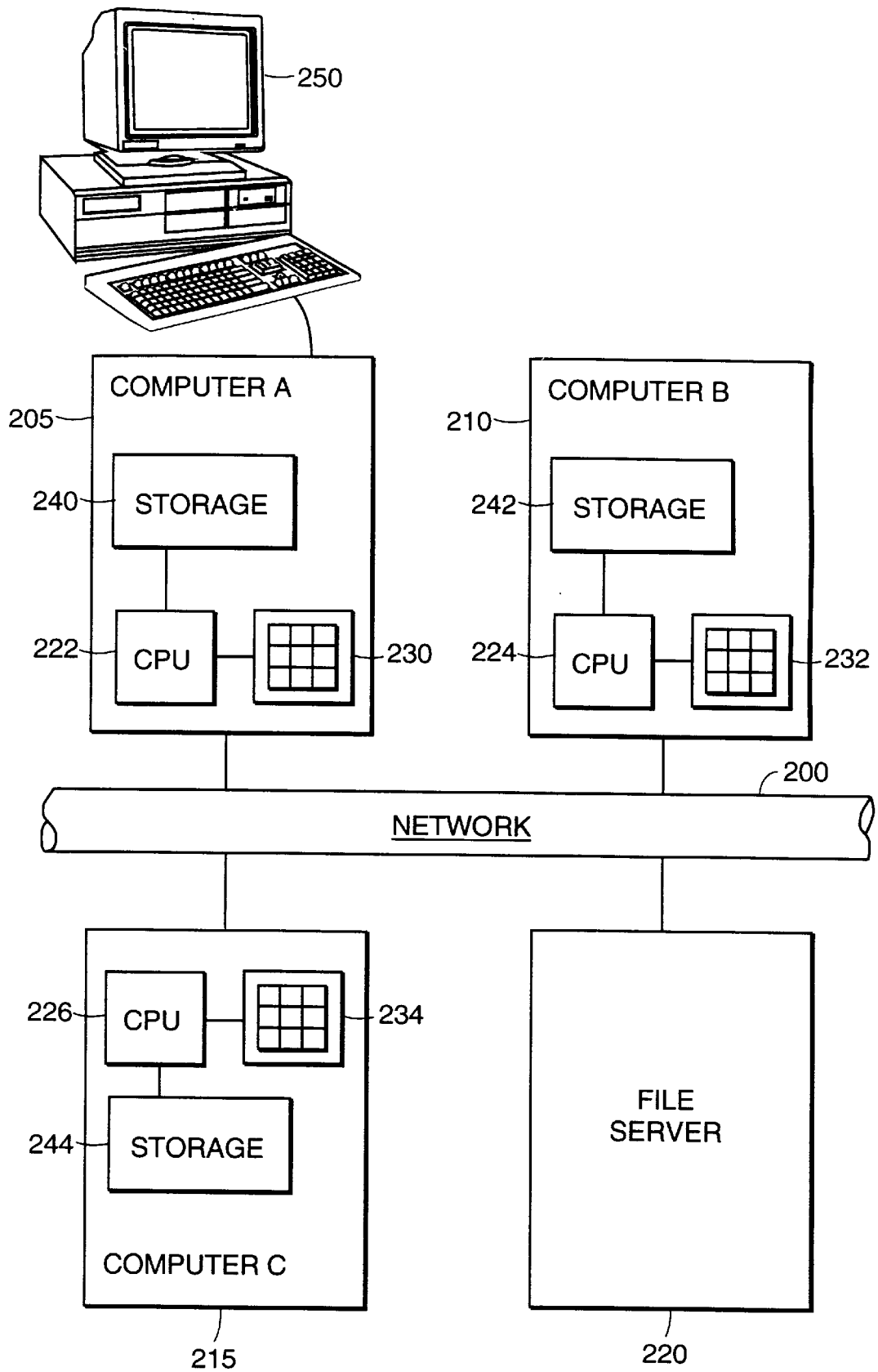
FIG. 2 is a distributed computing system.

FIG. 2 shows an exemplary distributed computing system. A network 200 connects four computers, computer A 205, computer B 210, and computer C 215, and a file server 220. Each computer has a CPU 222, 224, 226, a memory 230, 232, 234 and storage 240, 242, 244. A directory tree could be spread over the system shown in FIG. 2. A user of the distributed computing system could access the directory tree through a terminal 250 such as that on computer A 205.

There are a number of advantages to a large directory tree spread over a distributed computing system, including savings on duplication of resources and a greater availability of resources to the users of the system. However it is important that such a tree be easy to use and secure. Data and resources must be accessible yet simultaneously there must be system security, that is, communications and access to resources must be controlled to maintain the integrity of the tree and to protect access to data.

Distributed computing systems may control communications and access to resources by a method called authentication. To authenticate is to verify the identity of a principal. A principal is defined as something whose identity can be verified, like a user, a computer or a process. A typical example of authentication is the use of passwords on computers.

Figure 3:
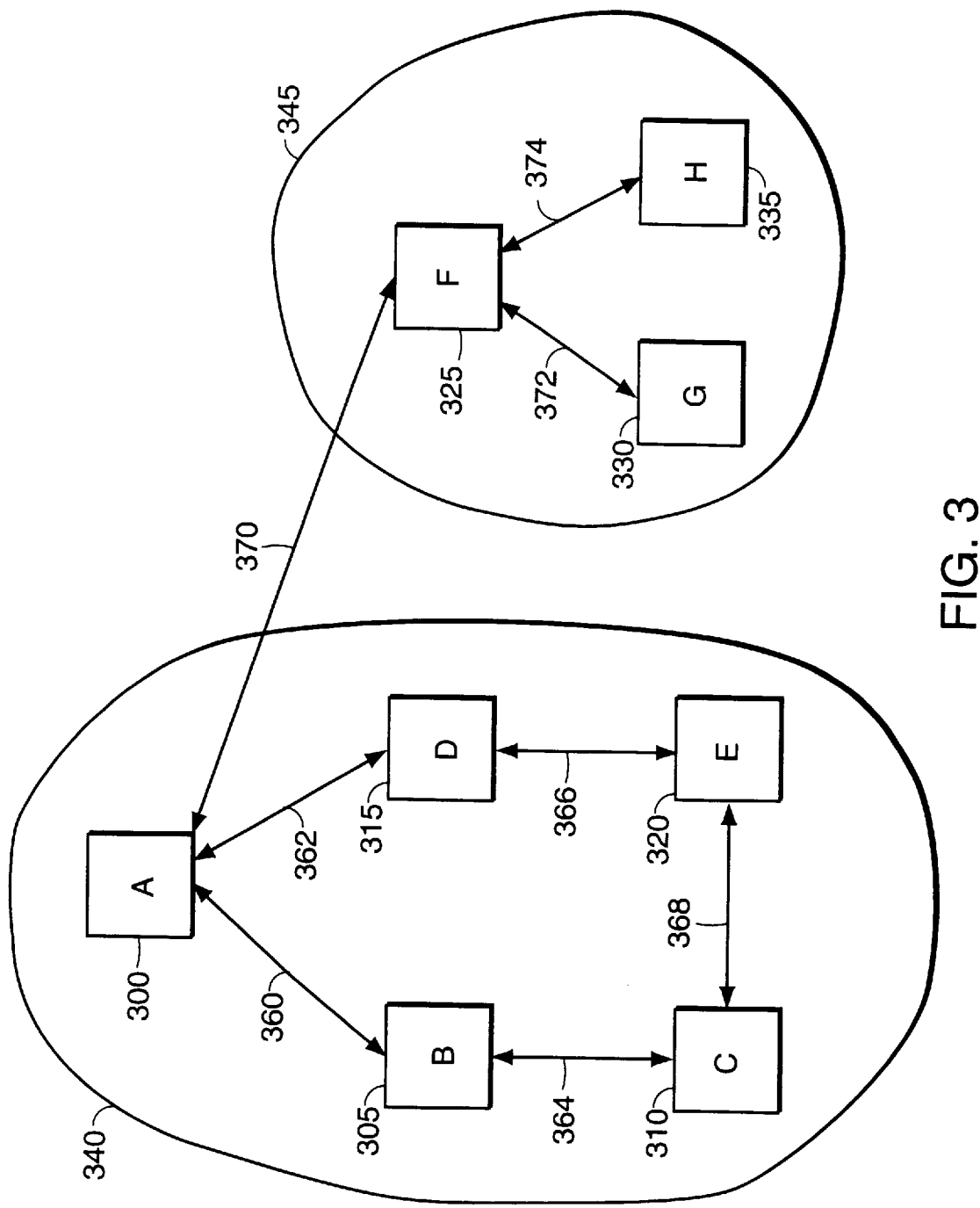
FIG. 3 is an authentication hierarchy.

Authentication in large distributed systems can be performed by using authentication hierarchies such as that shown in FIG. 3. An authentication hierarchy is defined as a structure of principals 300, 305, 310, 315, 320, 325, 330, 335 with authentication relations, 360, 362, 364, 366, 368, 370, 372, 374. Authentication relations are also called authentication links. For example, in FIG. 3, one of the authentication relations is "principal A 300 has jurisdiction over principal B 305" which means both "principal A 300 has the authority to authenticate principal B 305" and "principal B 305 accepts whatever authentication principal A 300 accepts." A group of machines may function as a principal which is referred to as a cell. In FIG. 3, principals A 300, B 305, C 310, D 315 and E 320 form a first cell 340, and principals F 325, G 330 and H 335 form a second cell 345.

A trust ancestor or trust descendant refers to ancestor/descendant relationships in the authentication hierarchy. For example, principal A 300 is a trust ancestor of principal C. Peer links may be established between principals in order to establish authentication short cuts. For example, principal C and principal E have a peer link 368, also called a cross-link, between them.

The names of principals and the links connecting them may be stored in an authentication link service in the same way that names of files are stored in a directory service. The authentication link service may also be known as the security service. The principals may all be found in the directory tree as well as the authentication tree. Thus, searching through the authentication tree may be related to the directory tree. Alternatively, the directory service and authentication service could be combined, that is, both the directory hierarchy links and the authentication links could be stored in a single service. By using the principals and links from the authentication link service, a more efficient method for browsing the directory tree is created and a security system is turned to the further advantage of making the directory tree easier to use by authorized users.

A way for one principal to authenticate another is to use passwords. Returning to FIG. 3, if principal A 300 is to authenticate principal B 305, a password is established that principal B 305 will present on demand by principal A 300. But if this exchange happens over a network, many other principals can eavesdrop on the exchange, read the password and later pose as principal B 305.

Encryption improves the security of the simple password system. The present invention may be used with either secret-key encryption or public key encryption. In secret key encryption, a password, or key, is established, and both principal A 300 and principal B 305 know the key. Principal B 305 does not present the key itself to principal A 300. Rather, principal B 305 uses the key to encrypt some unique message, such as the current time. Principal A 300 decrypts the message using the key and thereby authenticates principal B 305. Any eavesdropping principals would learn nothing that would help them to pose as either principal A 300 or principal B 305.

However, if every principal were to authenticate every other principal in a large system, setting up the necessary number of keys would be impractical. In order for every principal to be able to authenticate every other principal, every pair of principals would have to be given a unique key. In a system having n principals, $n^2-n$ keys would have to be chosen and securely communicated. Because providing such a large number of keys is prohibitively complex, intermediaries called authentication agents are used.

Figure 4:
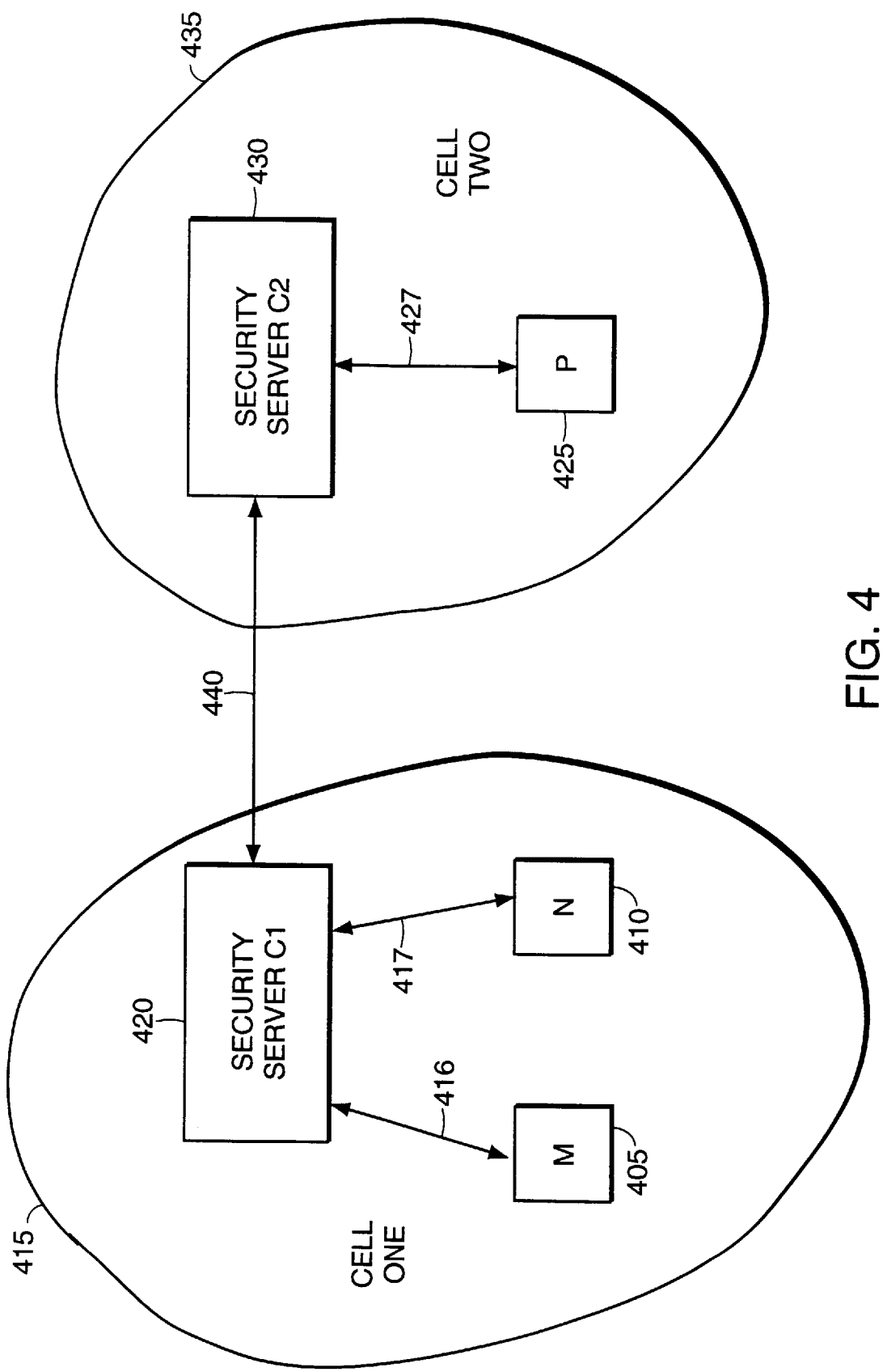
FIG. 4 shows connected cells with security servers.

FIG. 4 shows an exemplary implementation of the invention, an authentication system which has both encryption and intermediaries. In FIG. 4, each principal belongs to a cell, i.e. a group, and each cell has an intermediary, called a security server, to which all the principals in that cell have an authentication link. Principal M 405 and principal N 410 are in the same cell, Cell One 415. Both Principal M 405 and principal N 410 are linked by authentication links 416, 417 to a security server C1 420. If principal N 410 wants to contact principal M 405, then principal N 410 first contacts Cell One's security server C1 420, instead of contacting principal M 405 directly. The security server C1 420 vouches for principal N 410 to principal M 405. There are many well-known cryptographic systems which may be used. Principal P 425 is linked by an authentication link 427 to a security server C2 430 in Cell Two 435. Cell One's security server C1 420 and Cell Two's security server C2 430 have an authentication link 440 between them. If principal P 425 wanted to communicate with principal M 405, then principal P 425 would contact its own security server C2 430, which would vouch for principal P 425 to Cell One's security server C1 420, which finally vouches for principal P 425 to principal M 405.

The intermediary system greatly reduces the number of keys which must be chosen and communicated. However, every principal must have a unique key and every pair of intermediaries must have a unique pair of keys between them, which may still be a very large number of keys.

To further reduce the number of keys needed, intermediaries are chained in a restricted chain. The number of encryption keys which are needed is reduced by allowing for authentication chains which have more than two intermediaries. The restrictions are for system security; they prevent someone or something controlling one of the intermediaries from compromising the entire system.

Figure 5:
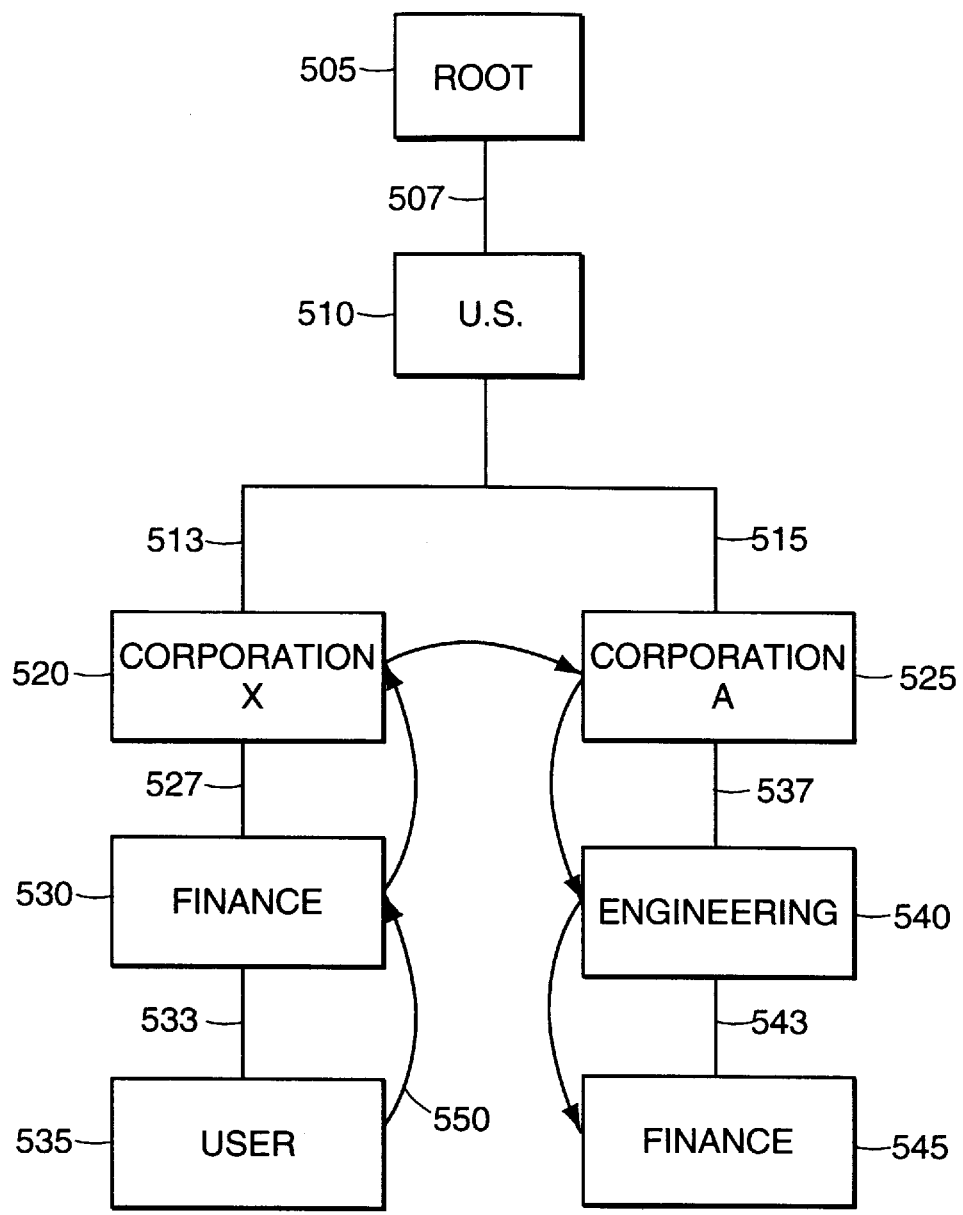
FIG. 5 is a directory tree with an authentication chain.

FIG. 5 shows an exemplary tree with several levels. The root 505 of the tree has one branch 507 leading to one principal named U.S. 510. The principal U.S. 510 has two branches 513, 515 leading to principals on the next lower level, Corporation X 520 and Corporation A 525. Corporation X 520 has a branch 527 leading to a first principal called Finance 530. Finance 530 has a branch 533 leading to a principal called User 535. Corporation A 535 has a branch 537 leading to a principal called Engineering 540 and Engineering 540 has a branch 543 leading to a second principal called Finance 545. Although there are two principals called "Finance," each of them has a unique name drawn against the tree. The name is drawn from the tree hierarchy. For example, the unique name of the principal Finance 530 under Corporation X 520 is "/U.S./Corporation X/Finance" while the unique name of the principal Finance 545 under Corporation A 525 is "/U.S./CorporationA/ Engineering/Finance." A valid authentication chain is restricted to the following rules which must be applied in sequence:

| | | |
|---|---|---|
| a) | zero or more up-links (wherein a principal vouches for one of its ancestors) | (3) |
| b) | zero or one cross-links (wherein a principal vouches for another principal that is neither an ancestor nor a descendant) | (4) |
| c) | zero or more down-links (wherein a principal vouches for one of its descendants). | (5) |

The above rules enhance system security in that they ensure that only ancestors of the two end principals involved in an authentication chain can successfully disguise an imposter as one of the principals.

Other rules which accomplish the same effect may be used. For example, in a system where there is one well-known principal which all other principals trust, the following rules will produce a valid authentication chain:

| | | |
|---|---|---|
| (a) | zero or more up-links | (6) |
| (b) | zero or one cross-link to the well-known principal | (7) |
| (c) | zero or one other cross link | (8) |
| (d) | zero or more down-links. | (9) |

Applying the above rules to the tree in FIG. 5 to authenticate User 535, as someone who may access information in Corporations A's Finance node 545, for example, could yield the following authentication chain 550:

/U.S./Corporation X/Finance/User (535)
/U.S./Corporation X/Finance (530)
/U.S./Corporation X (520)
/U.S./Corporation A (525)
/U.S./Corporation A/Engineering (540)
/U.S./Corporation A/Engineering/Finance (545)

The authentication scheme described above may be implemented in a graphical browser. By browsing principals along authentication links, names which are not useful or needed in a particular search through the tree may be eliminated from the browser view. In the exemplary embodiment of the invention, the links described are used for security, however, if links with the required structure exist in a tree, the invention works whether or not the links are used for security.

Figure 6:
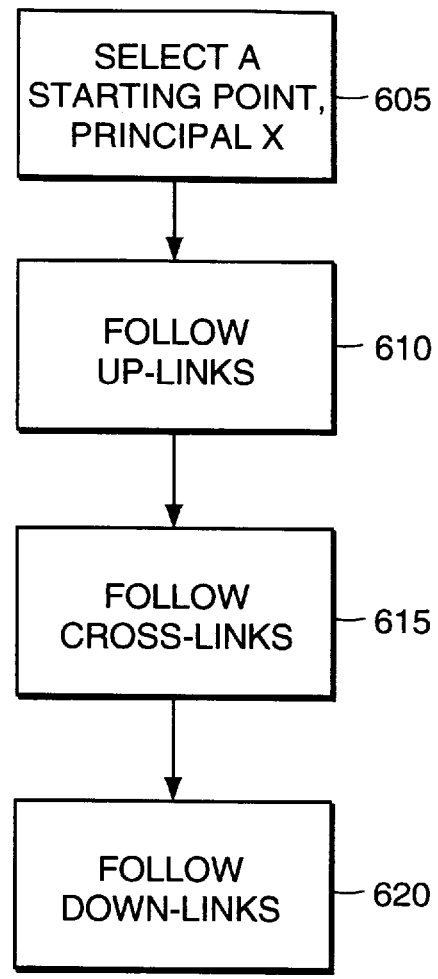
FIG. 6 is a browser flow chart.

The steps of the browser are illustrated in FIG. 6. The browser requires as input the name of a known principal, for example, a principal called X, box 605; In order to make a list of all the principals that principal X could authenticate, the browser would follow the up-links starting from principal X, box 610. This yields the names of the principals reachable by uplinks from X. Then, starting from principal X and each of the principal names obtained in the previous step, box 610, follow all the cross-links, to obtain a number of additional principal names, if there are any, box 615. Lastly, starting from principal X and each of the principal names obtained in both the two previous steps, follow all of the down-links, box 620.

The above-described steps result in the names of all the principals which X can authenticate, according to the rules for valid authentication chains. This method alone is impractical because there may be far too many principals for X to browse if the directory was very large. If the up-link and cross-link steps were performed in advance, a smaller, more manageable set of names that contains at least one ancestor of every name that X can authenticate or else contains the authenticable name itself would result. Then the down-links could be followed on demand as a user browses down the tree.

It is not necessary to cryptographically validate the authentication chains in order for the browser to work. However, if the authentication chains are not cryptographically validated, the browser may list a few principals that the user cannot actually authenticate, a result which is generally inconsequential.

Figure 7:
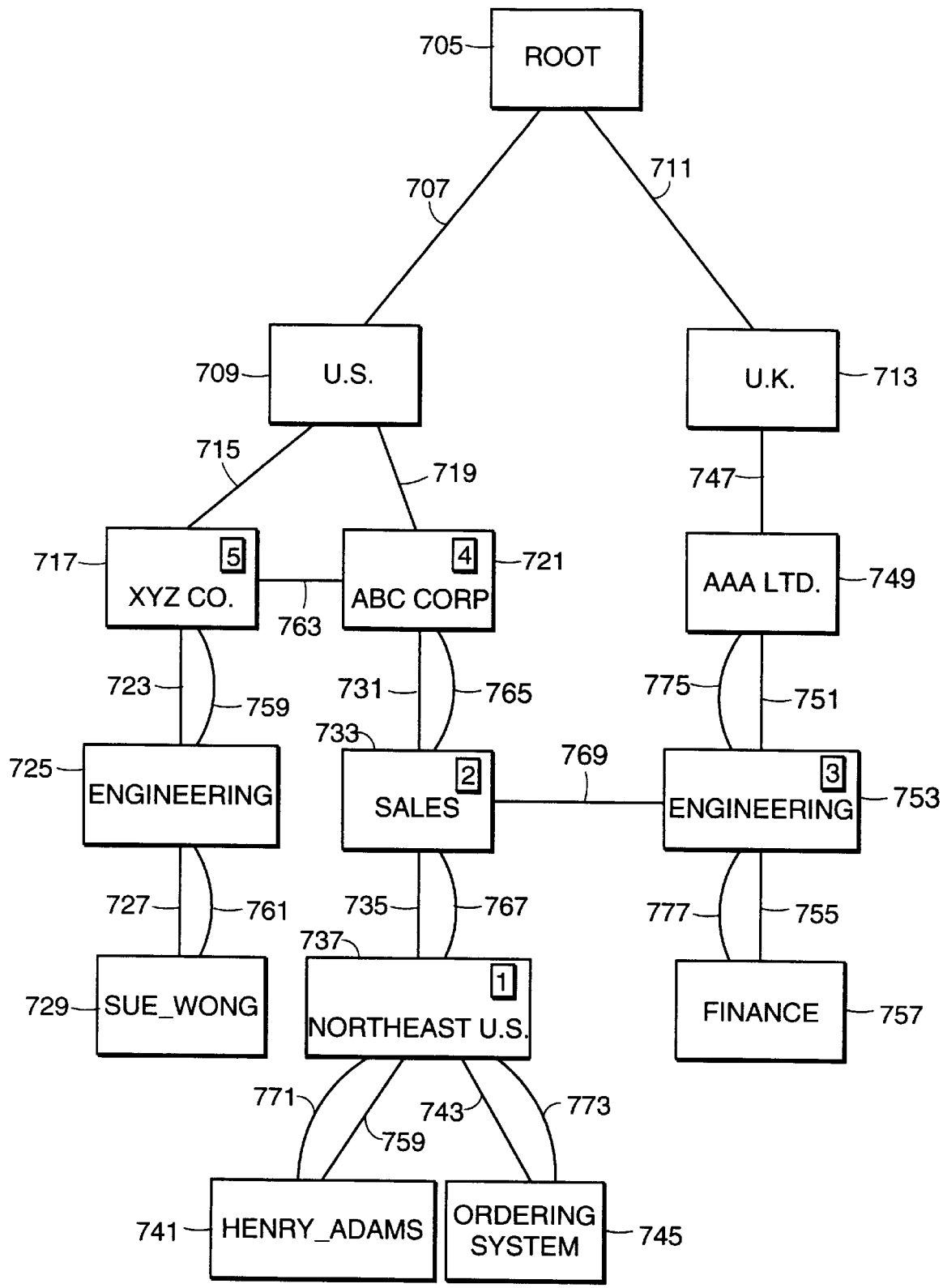
FIG. 7 is a directory tree with authentication links.

FIG. 7 shows an exemplary tree which may be used to illustrate the actions of the browser. The root 705 of the tree has one branch 707 leading to a principal called U.S. 709 and one branch 711 leading to a principal called U.K. 713. The principal U.S. 709 has one branch 715 leading to a principal called XYZ Co. 717 and one branch 719 leading to a principal called ABC Corp. 721. The principal XYZ Co. 717 has a branch 723 leading to a principal called Engineering 725 which in turn has a branch 727 leading to a principal called Sue__Wong 729. The principal ABC Corp. 721 has a branch 731 leading to a principal called Sales 733. Sales 733 has a branch 735 leading to a principal called Northeast U.S. 737 which has a first branch 739 leading to a principal called Henry__Adams 741 and a second branch 743 to a principal called Ordering System 745. The principal U.K. 713 has a branch 747 leading to a principal called AAA Ltd. 749. AAA Ltd. 749 has a branch 751 leading to a principal called Engineering 753 which has a branch 755 leading to a principal called Finance 757.

The tree in FIG. 7 also has authentication links. XYZ Co. 717 and Engineering 725 have an authentication link 759 between them. Engineering 725 and Sue__Wong 729 have an authentication link 761. XYZ Co. 717 and ABC Corp. 721 have an authentication cross-link 763. ABC Corp. 721 and Sales 733 have an authentication link 765. Sales 733 also has an authentication link 767 with Northeast U.S. 737 and an authentication cross-link 769 with Engineering 753. Northeast U.S. 737 has an authentication link 771 with Henry__Adams 741 and another authentication link 773 with Ordering System 745. Engineering 753 has an authentication link 775 with AAA Ltd. 749 and an authentication link 777 with Finance 757.

For example, if the person Henry Adams is browsing, the principal Henry_Adams 741 will be used as the starting point for the browser. Before the browser is started up, a set of authenticable roots, i.e. a set of the roots of subtrees, is created by performing the steps from blocks 610 and 615 from FIG. 6. That is, the up-links and the cross-links from Henry_Adams 741 are followed and the set is created in the following order, Northeast U.S. 737, Sales 733, Engineering 753, ABC Corp. 721, and XYZ Co. 717.

Figure 8:
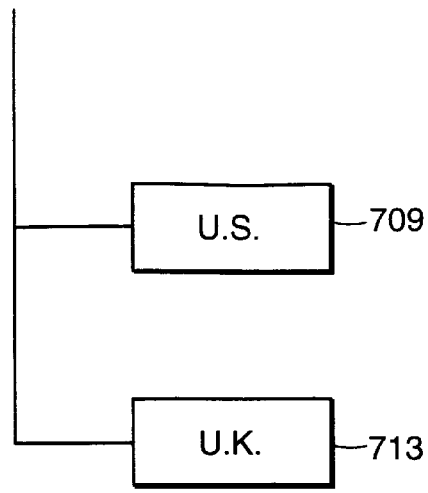
FIG. 8 is a first browser display.
Figure 9:
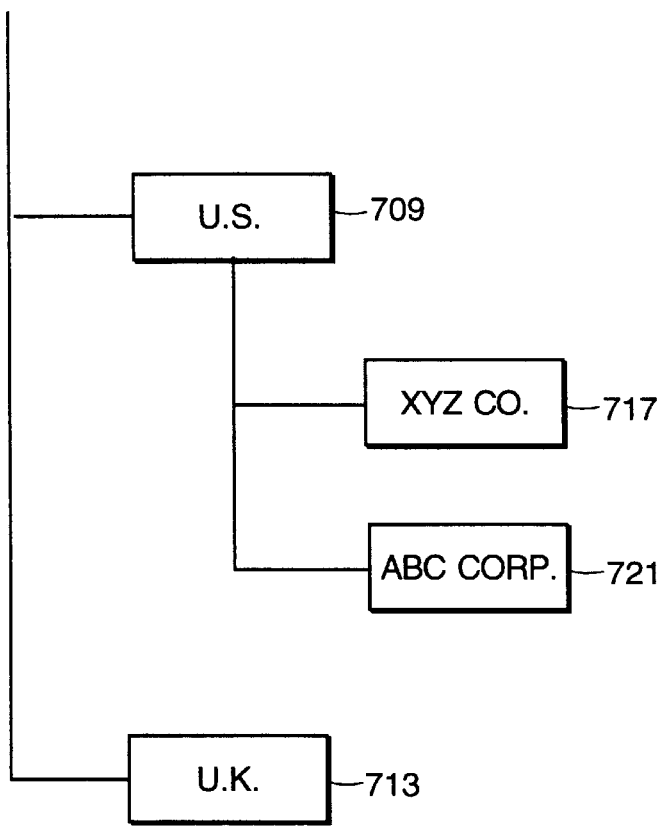
FIG. 9 is a second browser display.
Figure 10:
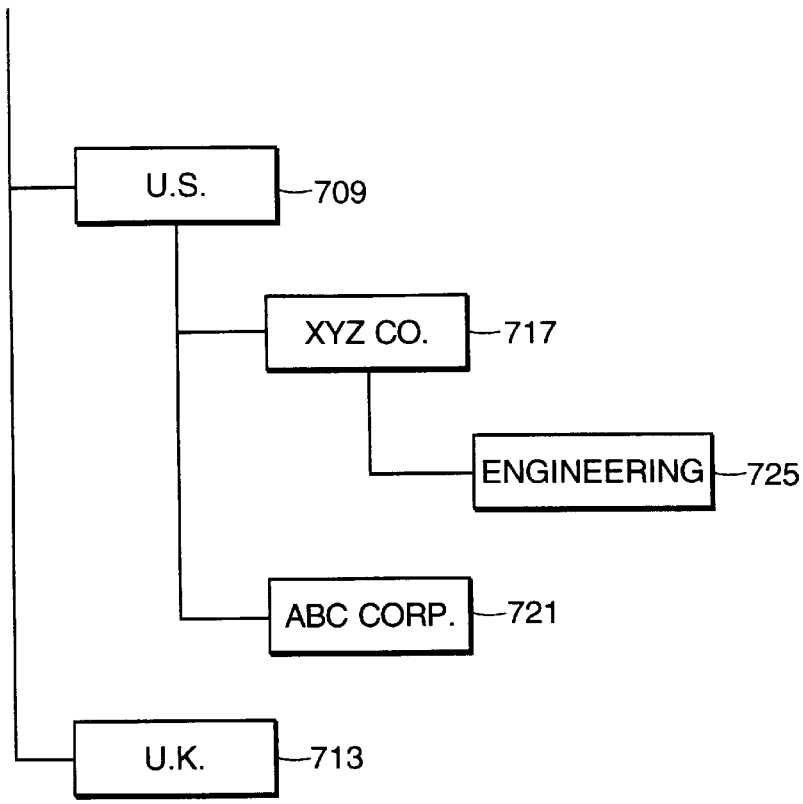
FIG. 10 is a third browser display.
Figure 11:
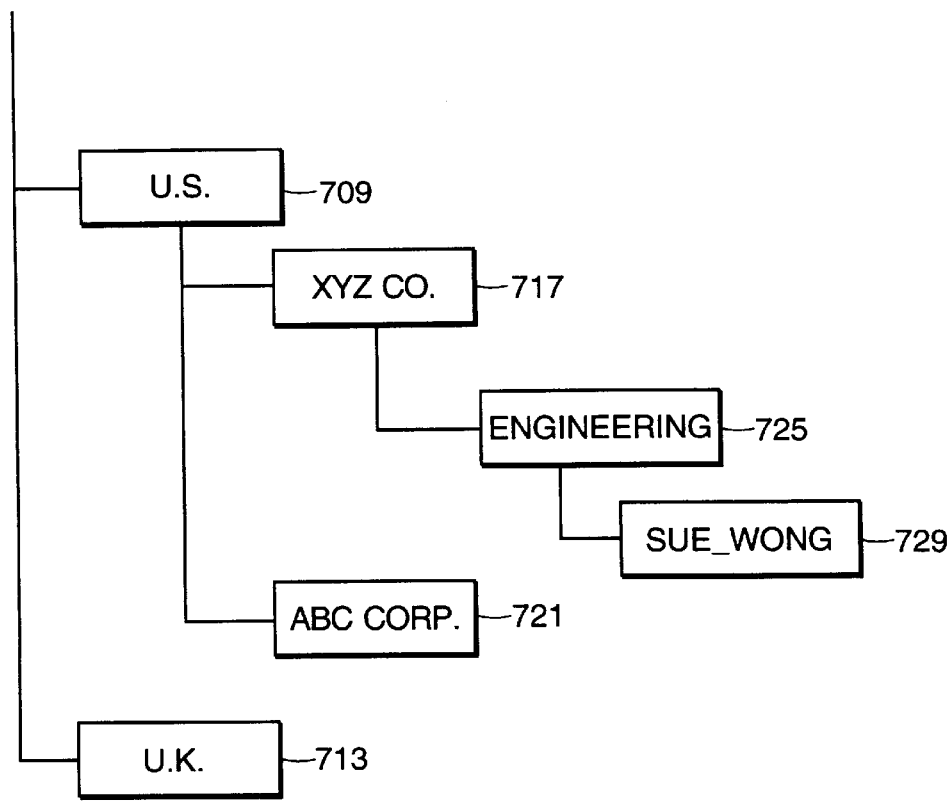
FIG. 11 is a fourth browser display.

When user Henry Adams starts the browser, represented as principal Henry_Adams 741, the principals U.S. 709 and U.K. 713 are displayed as shown in FIG. 8, because they are the top-level names that have descendants in the set of authenticable roots created before-hand. If Adams expands U.S. 709, the principals U.S. 709 with the principals XYZ Co. 717 and ABC Corp. 721 as well as the principal U.K. 713 are displayed as shown in FIG. 9. XYZ Co. 717 and ABC Corp. 721 are part of the authenticable roots set. If Adams expands on the principal XYZ Co. 717, the principals U.S. 709, XYZ Co. 717, Engineering 725, ABC Corp. 721 and U.K. 713 are displayed as shown in FIG. 10. Engineering 725 is displayed because XYZ Co. 717 has an authentication down-link to it. If Adams expands on the principal Engineering 725, the principals U.S. 709, XYZ Co. 717, Engineering 725, Sue_Wong 729, ABC Corp. 721 and U.K. 713 are displayed as shown in FIG. 11.

The creation of the authenticable roots may be done on a batch basis performed periodically, or it may be done when the user starts up the browser.

Pseudo-code implementation of the browser forming the authenticable roots set is as follows below.

```
PENDING_PRINCS := {STARTING_PRINCIPAL};
                                // A queue of names to be processed
PRINC_AND_ANCESTORS := {};      // The empty set, initially
// Follow up-links repeatedly, starting from STARTING_PRINCIPAL.
// This will yield the names of all principals reachable by
// uplinks from STARTING_PRINCIPAL.
While PENDING_PRINCS <> {} Do
    // Pick a pending name to process.
    PRINC := longest and deepest member of PENDING_PRINCS;
    PENDING_PRINCS := PENDING_PRINCS - {PRINC};
    // Add the name to the set.
    PRINC_AND_ANCESTORS := PRINC_AND_ANCESTORS + {PRINC};
    // And continue up the tree.
    Go out to the authentication link service and obtain all the
up-links that start from PRINC.
    For each principal U that principal PRINC has an up-link
        to, Do
            PENDING_PRINCS := PENDING_PRINCS + {U};
    END For;
END While;
// Now PRINC_AND_ANCESTORS contains the name of the initial
// principal and all ancestors reachable by up-links.
// Starting from STARTING_PRINCIPAL and each of the principal
// names obtained above, follow all of the cross-links, to obtain
// additional principal names.
AUTHENTICABLE_SUBTREE_ROOTS : = PRINC_AND_ANCESTORS;
For each PRINC in PRINC_AND_ANCESTORS Do
    Go out to the directory and obtain all cross-links that
        start from PRINC.
    For each principal C that principal PRINC has a cross-link
        to, Do
            AUTHENTICABLE_SUBTREE_ROOTS :=
                    AUTHENTICABLE_SUBTREE_ROOTS + {C};
END    //  AUTHENTICABLE_SUBTREE_ROOTS set.
```

The authenticable roots set is a set of principals names with the following properties:

| | |
|---|---|
| Starting_Principal X can authenticate every member of the set. | (10) |
| For every principal Y that Starting_Principal X can authenticate, either Y or an ancestor of Y is a member of the set. | (11) |

The authenticable roots set is stored in the authentication link service on disk or other storage until a user starts up the browser. Each authenticable roots set is stored under the name of the principal doing the authenticating.

An alternative embodiment of the invention deals with the problem of the heavy load placed on directories near the root. If the browser is widely used, the directories near the root will be frequently queried for up-links and cross-links, that is, every principal under any given directory will query that directory at least once a day. The pseudo-code alternative embodiment is as follows:

```
PENDING_PRINCS := {STARTING_PRINCIPAL};
                           // A queue of names to be processed.
AUTHENTICABLE_SUBTREE_ROOTS := { };   // Initially,
an empty set.
While PENDING_PRINCS < > { } Do
    // Pick a pending name to process.
    PRINC := longest and deepest member of PENDING_PRINCS;
    PENDING_PRINCS := PENDING_PRINCS - {PRINC};
    // Add the name to the set.
    AUTHENTICABLE_SUBTREE_ROOTS :=
        AUTHENTICABLE_SUBTREE_ROOTS + {PRINC};
    If PRINC < > STARTING_PRINCIPAL Then
        // PRINC is an ancestor of STARTING_PRINCIPAL.
        Go out to the directory to see whether an
            AUTHENTICABLE_SUBTREE_ROOTS set associated
            with PRINC is there.
        If so,
```

```
            Add all the members of that set to our own
                AUTHENTICABLE_SUBTREE_ROOTS set (since
                any principal that PRINC can reach,
                STARTING_PRINCIPAL can reach too).
            EXIT;
            END If;
        END If;
    Go out to the directory and obtain all cross-links
        that start from PRINC.
    For each principal C that principal PRINC has a
            cross-link to, Do
        AUTHENTICABLE_SUBTREE_ROOTS :=
            AUTHENTICABLE_SUBTREE_ROOTS + {C};
    // And continue up the tree.
        Go out to the directory and obtain all up-links
            that start out from PRINC.
        For each principal U that principal PRINC has an
            up-link to, Do
                PENDING_PRINCS := PENDING_PRINCS + {U};
            END For;
END While;
```

This alternative embodiment can be performed periodically, and the resulting set of principal names can be stored in the directory service, associated with STARTING_PRINCIPAL. It is possible to have both methods for establishing authenticable roots sets operating in the same browser system.

When the user is browsing, initially it is desirable to show all the children of the root that are authenticable or have authenticable descendants. This is implemented in pseudo-code as follows:

```
AUTHENTICABLE_NAMES :=
AUTHENTICABLE_SUBTREE_ROOTS
If the root if a member of AUTHENTICABLE_NAMES Then
    For each principal Y that the root has a down-link to, Do,
                AUTHENTICABLE_NAMES :=
                AUTHENTICABLE_NAMES + {Y}
    END For
End If
Let NEW_NAMES := { }
For each Y in AUTHENTICABLE_NAMES Do
    If Y is a child of the root then
            NEW_NAMES := NEW_NAMES + {Y}
    Else
            Let T be the child of the root that is an
                ancestor of Y.
            NEW_NAMES := NEW_NAMES + {T}
    END If
End For
Display the names in NEW_NAMES
// Some of the names displayed may belong to AUTHENTICABLE_
// NAMES, and others may have descendants that belong to
// AUTHENTICABLE_NAMES.
```

When the user expands a name other than the root, it is desirable to show all children of that name that are authenticable or have authenticable descendants. Let Z denote the name to be expanded. This is implemented in pseudo-code as follows:

```
If Z if a member of AUTHENTICABLE_NAMES Then
    For each principal Y that principal Z has a down-link to,
    Do,
        AUTHENTICABLE_NAMES :=
        AUTHENTICABLE_NAMES + {Y}
    END For
End If
Let NEW_NAMES := { }
For each Y in AUTHENTICALBE_NAMES Do
    If Y is a child of Z then
            NEW_NAMES := NEW_NAMES + {Y}
    Else if Y is a descendant of Z Then
            Let T be the child of Z that is an ancestor of Y.
            NEW_NAMES := NEW_NAMES + {T}
    END If
End For
Display the names in NEW_NAMES
// Some of the names displayed may belong to AUTHENTICABLE_
// NAMES, and others may have descendants that belong to
// AUTHENTICABLE_NAMES.
```

When the user collapses an item in the browser, the set of AUTHENTICABLE_NAMES would be pared back to keep the memory requirements from becoming excessive.

Figure 12:
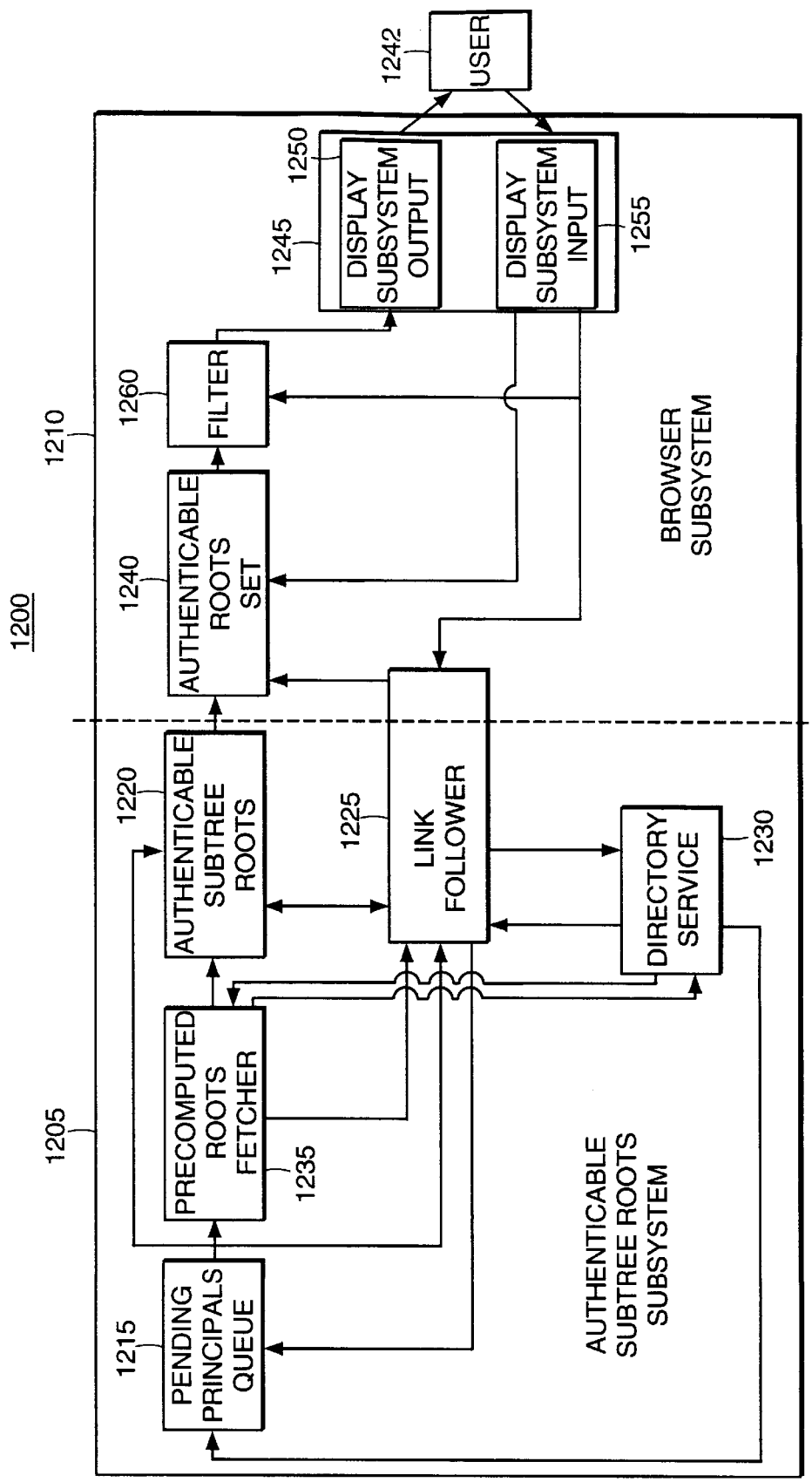
FIG. 12 shows the operation of the browser system.

The operation of the browser is illustrated in FIG. 12. The browser system 1200 has two main parts, the authenticable subtree roots subsystem 1205 and the browser subsystem 1210. The browser 1200, in the authenticable subtree roots system 1205, starts with an input of the name of a known principal, for example, a principal called X. Principal X could be any principal however it would generally not be a leaf principal. The leaf principal and the cell above it have identical links making it more efficient to start with the cell.

Principal X is input for initialization of a pending principals queue 1215. The pending principals queue 1215 is a priority queue in which the names of principals are prioritized by length. Initially the queue contains only one name, principal X. As the browser operates, the names of all of principal X's ancestors to which it has uplinks will be added to the queue 1215.

Next, the principal with the longest name, meaning that it is deepest in the directory tree, is taken from the queue 1215 and added to a set called the authenticable subtree roots set in the authenticable subtree roots store 1220. As the browser 1200 operates, the authenticable subtree roots set will contain the initial principal name, Principal X, and all of the names of principals to which Principal X has up-links and cross-links.

So far in this example, Principal X is the only principal in the queue, so it would have the longest name, and it is passed on to the authenticable subtree roots set.

Principal X would also be given to the link follower 1225. The link follower 1225 interacts with the directory service 1230 to obtain all of the links from the principal, and then sorts the up-links and the cross-links. The link follower 1225 adds all of the names of principals linked to principal X by up-links or cross-links to the authenticable subtree roots set. The link follower 1225 also adds all the names connected to principal X by up-links to the pending principals queue 1215.

In the most efficient embodiment of the invention, Principal X would given to the precomputed roots fetcher 1235 after being taken from the pending principals queue 1215 as well as to the authenticable subtree roots set and the link follower 1225. The precomputed roots fetcher 1235 is not essential to the invention, but increases efficiency by taking advantage of names already in the authenticable subtree roots set, i.e. names of principals whose links have already been established. The precomputed-roots fetcher 1235 takes input of the original name from the pending principals queue 1215 and the name just removed from the queue 1215. If the names are equal, then the precomputed-roots fetcher 1235 does nothing, except to send a "not found" signal out to the link follower 1225. If the names are unequal, in which case the principal from the link follower 1225 is an ancestor of the original principal, then the precomputed-roots fetcher 1235 sends out a query to the directory/security service 1230. The query is to retrieve the authenticable roots set associated with the name. If a set of names comes back, the fetcher 1235 sends these to the authenticable-subtree roots set store 1220. If no set of names comes back, the fetcher sends a "not found" signal to the link follower 1225. The link follower 1230 waits for a "not found" signal before starting to follow links.

The process of removing the longest name from the pending principals queue 1215 through searching for up-links and crosslinks and adding sets to the authenticable subtree roots store 1220 is repeated until there are no more ancestors of the starting principal, Principal X, reachable by up-links.

Once the authenticable subtree roots set is created by the authenticable subtree roots subsystem 1205, it is used to initialize a set of authenticable roots 1240 in the browser subsystem 1210. The authenticable names set 1240 is the set of known principals available for browsing.

The authenticable names set 1240 receives input from the user 1242 of the system through an interface, the display subsystem 1245. The display subsystem 1245 has a display output 1250 for the user and a display manipulation subsystem 1255 through which the user can command the browser 1200.

When the user chooses to expand the browser display, the name of the principal from which the user wishes to expand is given to the link follower 1225 which gets all the names of principals linked by down-links. The names of these principals is given to the authenticable roots set 1240. When the user chooses to collapse a part of the browser display, the name of the principal to be collapsed is given to the authenticable roots set 1240 and all descendants are removed from the authenticable roots set 1240 unless the name is part of the subtree roots set 1220. The authenticable roots set 1240 is at all times a superset of the authenticable subtree roots set 1220.

Whenever a new name is to be expanded on the browser display, the filter 1260 takes input from the authenticable roots set 1240 and extracts just those names that are children of the name to expand. The resulting, usually smaller, set of names is sent to the display subsystem 1245.

The display subsystem 1245 can be based on any of several widely used systems for displaying a hierarchy using a graphical display device. Initially, only the root is displayed. When names are supplied on input to the display subsystem 1245, they are added to the display that the user sees. When a name is to be collapsed, all descendants of that name are removed from the display.

When the link follower 1225 receives a name from the display subsystem 1245, it sends one or more queries to the directory/security service 1230 to obtain all down-links from the name. The directory service 1230 responds with the names, if any, that are the targets of down-links from the name. The link follower 1225 sends these names to the authenticable roots set 1240.

Upon initial operation of the browser system 1200, the authenticable subtree roots set is loaded into the authenticable roots set 1240. The name to be expanded initially is the root. The link follower 1225 follows all down-links from the root and the names of the principals found by the link follower are added to the authenticable roots set 1240. The filter 1260 extracts those members of the authenticable roots set 1240 that are children of the root, and sends them to the display subsystem 1245. Thereafter, when the user picks a name to expand, that name is sent to the link follower 1225, which follows all down-links from the name and adds them to the authenticable roots set 1240. Then the filter 1260 extracts those members of the authenticable roots set 1240 that are children of the name being expanded. These names are sent to the display subsystem 1245.

In collapsing the browser display, the name to be collapsed is sent to the authenticable roots set 1240. All descendants of that name are removed from the set 1240, except for names that belong to the authenticable subtree roots set 1220. This removal is optional, and is a way of limiting memory demands. Names could instead be retained for a longer time. In any case, the name to be collapsed is also sent to the display subsystem 1245, which removes all descendants of that name from the browser display.

It is to be understood that the above-described embodiments are simply illustrative of the principles of the invention. Various and other modifications and changes may be made by those skilled in the art which will embody the principles of the invention and fall within the spirit and scope thereof.

What is claimed is:

1. A method for browsing a large directory tree having a plurality of principals, comprising the steps of:

forming a plurality of authentication links among the plurality of principals, each authentication link linking one of the plurality of principals to one other principal, each principal in a linked pair able to verify the other principal in the linked pair by key encryption;

establishing a plurality of cells having one or more principals, one of the principals in each cell being an intermediary and every other principal in each cell being linked to the intermediary by an authentication link;

establishing at least one restricted chain among the plurality of cells, by linking intermediaries where each intermediary of said chain is linked to at least one other intermediary of said chain by an authentication link, said chain having zero or more up-links wherein a first intermediary in said chain vouches for an ancestor of said first intermediary, zero or one cross-link wherein a second intermediary in said chain vouches for a third intermediary that is neither an ancestor or a descendant of said second intermediary, and zero or more down-links wherein a fourth intermediary vouches for a descendant of said fourth intermediary;

predetermining the up-links of said chain;

predetermining the cross-links of said chain; and storing the predetermined up-link and predetermined cross-links for use by a user during browsing.

2. An apparatus for browsing a large directory tree having a plurality of principals, comprising:

means for storing the directory tree;

means for establishing a plurality of authentication links among the plurality of principals, each authentication link linking one of the plurality of principals to one other principal, each principal in a linked pair verifying the other principal in the linked pair by key encryption;

means for establishing a plurality of cells having one or more principals, one of the principals in each cell being an intermediary and every other principal in each cell being linked to the intermediary by an authentication link;

means for establishing at least one restricted chain among the plurality of cells of said chain linked to at least one other principal of said chain by an authentication link, said chain having zero or more up-links wherein a first principal in said chain vouches for an ancestor of said first principal, zero or one cross-link wherein a second principal in said chain vouches for a third principal that is neither an ancestor or a descendant of said second principal, and zero or more down-links wherein a fourth principal vouches for a descendant of said fourth principal;

means for predetermining the up-links of said chain and for predetermining the cross-link of said chain from said means for storing the directory tree; and means for storing the predetermined up-links and predetermined cross-links for use by a user during browsing.

3. The apparatus of claim 2 wherein said means for storing the directory tree resides on a single computer.

4. The apparatus of claim 2 wherein said means for storing the directory tree is distributed over a computer network.

5. The apparatus of claim 2 wherein said means for storing the directory tree further comprises a directory service.

6. The apparatus of claim 5 wherein said means for storing further comprises an authentication link service.

7. A method for browsing a large directory tree having a plurality of principals, comprising the steps of:

forming a plurality of authentication links among the plurality of principals, each authentication link linking one of the plurality of principals to one other principal, each principal in a linked pair able to verify the other principal in the linked pair by key encryption;

establishing a plurality of cells having one or more principals, one of the principals in each cell being an intermediary and every other principal in each cell being linked to the intermediary by an authentication link;

establishing at least one restricted chain among the plurality of cells, by linking intermediaries where each intermediary of said chain is linked to at least one other intermediary of said chain by an authentication link, said chain having zero or more up-links, and zero or one cross-link;

predetermining the up-links of said chain;

predetermining the cross-links of said chain; and storing the predetermined up-links and predetermined cross-link for use by a user during browsing.

8. The method of claim 7 wherein an up-link is an authentication link between a principal and one of its ancestors.

9. The method of claim 7 wherein key encryption is the use of a password known to both principals in a linked pair in order to encrypt and decrypt a message sent from one principal in the linked pair to the other principal in the linked pair.

10. The method of claim 7 wherein the forming step further comprises establishing a key known to both principals in a linked pair.

11. The method of claim 10 further comprising:

verifying an authentication link between a first principal and a second principal in a linked pair comprising the steps of encrypting, in a first principal of the linked pair, a unique message using the key;

sending the unique message from the first principal in the linked pair to a second principal of the linked pair;

decrypting, the second principal of the linked pair, the unique message using the key.

* * * * *